US007771837B2

(12) United States Patent
Sczepan

(10) Patent No.: US 7,771,837 B2
(45) Date of Patent: Aug. 10, 2010

(54) DERIVED TIMBER BOARD WITH A SURFACE COATING APPLIED AT LEAST IN PARTS

(75) Inventor: Ralf Sczepan, Essen (DE)

(73) Assignee: Kronotec AG, Lucerne (CH)

( * ) Notice: Subject to any disclaimer, the term of this patent is extended or adjusted under 35 U.S.C. 154(b) by 515 days.

(21) Appl. No.: 11/351,956

(22) Filed: Feb. 10, 2006

(65) Prior Publication Data

US 2006/0183853 A1 Aug. 17, 2006

(30) Foreign Application Priority Data

Feb. 11, 2005 (DE) ........................ 10 2005 006 599

(51) Int. Cl.
*B32B 5/16* (2006.01)

(52) U.S. Cl. ........................ 428/526; 428/528; 428/530; 428/535; 428/536; 428/537.1; 427/384; 427/393; 427/385.5

(58) Field of Classification Search ................. 428/526, 428/528, 530, 535, 536, 537.1; 427/384, 427/393, 385.5
See application file for complete search history.

(56) References Cited

U.S. PATENT DOCUMENTS

| | | | |
|---|---|---|---|
| 5,039,566 A | 8/1991 | Skubic et al. | |
| 2007/0172687 A1 * | 7/2007 | Martin-Portugues et al. | 428/531 |

FOREIGN PATENT DOCUMENTS

| | | | |
|---|---|---|---|
| DE | DT 27 18 705 A1 | | 11/1977 |
| DE | 30 12 910 A1 | | 10/1980 |
| DE | 41 10 640 A1 | | 10/1991 |
| DE | 197 10 619 A1 | | 9/1998 |
| DE | 100 30 563 A1 | | 1/2002 |
| DE | 102004014819 A1 | * | 3/2004 |
| DE | 10 2004 014 819 A1 | | 3/2005 |

* cited by examiner

*Primary Examiner*—Leszek Kiliman
(74) *Attorney, Agent, or Firm*—Bachman & LaPointe, P.C.

(57) ABSTRACT

A derived timber board with a surface coating applied at least in parts is characterized in that at least one coating of a synthetic resin reinforced with fibers is applied as a surface coating. A method for applying the coating is also described.

14 Claims, No Drawings

DERIVED TIMBER BOARD WITH A SURFACE COATING APPLIED AT LEAST IN PARTS

BACKGROUND OF THE INVENTION (1) Field of the Invention

The invention refers to a derived timber board with a surface coating applied at least in parts and a method for applying such coating.

(2) Prior Art

Derived timber boards with a surface coating, which is usually applied to the upper side, as the case may be, also to the underside and the lateral surfaces, are known for many purposes. Floor panels made of derived timber board are gaining in importance, although this also applies to ceiling panels and wall panels, derived timber boards for room dividers and suchlike. It is common to use impregnates in order to obtain a resistant surface coating, which in the case of floors, is also scuff-resistant.

Impregnates are special papers impregnated with synthetic resin. The synthetic resins placed in the paper are cured until the papers are dry and suitable for storage. Following application to the derived timber boards, the impregnates are further cured under the influence of pressure and temperature. Pressure and temperature are normally applied in presses. During this process, the synthetic resin, which softens prior to final curing, flows through the paper frame to form a layer, which coats the surface of the derived timber board where the impregnate has been applied.

Depending on demands, the impregnate can comprise a paper printed with decorative elements. Corundum can be incorporated in the impregnate as an agent against scuffing.

The production of impregnates is elaborate and costly, particularly due to the expensive special papers, which serve as a base material for synthetic resin, the decoration and, if necessary, for corundum.

Therefore, methods have been developed for applying decorative elements directly to the surface of derived timber board without the use of carrier paper and also synthetic resins and, if necessary, corundum. This is exemplified by DE 27 18 705 A1, in which is described the application of melamine resin to chipboard. The melamine resin is provided with pigments or filling substances if necessary.

In detail, though, difficulties occurred when the predominantly thermosetting synthetic resins were applied, particularly in the processing of well suited and cost-advantageous aminoplastics. Until now, the synthetic resin, e.g. a melamine resin, was applied to the special paper and precondensed. Drying of the impregnate led to shrinkage as a result of a reaction of the synthetic resin. The special paper also participated in such change of form. No more significant form changes were observed when the impregnate was being pressed to the derived timber board.

When applying the synthetic resin directly to a derived timber board surface, the synthetic resin can, in principle, be applied sparingly, depending on the desired layer thickness. When applying a relatively thin coating directly, however, the fact that the synthetic resins do not always form the desired, uniform layer on the surface of the derived timber board is disadvantageous. The surface coating-exhibits a non-uniform layer thickness.

Beyond that, the shrinkage of the synthetic resin while curing turns out to be problematic. As a result of the strong shrinkage force created during curing, the curing synthetic resins exert a strong tensile force in the plane of the coated surface of the derived timber board, which partially leads to deformations, which make further processing of the coated board impossible. In addition, in combination with the relatively weak adhesive force of the thermosetting synthetic resins on the board, the strong shrinkage force causes coating fragments to pop off. The deficient film formation, which is observed in particular when melamine resins are used, causes parts of the synthetic resin to come off of the derived timber board during curing when a coating is applied directly to the surface of a derived timber board.

SUMMARY OF THE INVENTION

It is therefore an object of the present invention to provide a direct surface coating for a derived timber board that is applied directly, which avoids the aforementioned disadvantages.

The object is solved by a derived timber board exhibiting a surface coating of synthetic resin that is applied at least in parts in a liquid state, with at least one coating of a synthetic resin applied in a liquid state reinforced with fibers.

The synthetic resin coating applied in a liquid state is cured under the effect of increased temperatures and/or increased pressure.

Adding fibers while the synthetic resin is being applied directly to a derived timber board surface has unexpectedly proven to be very well suited for guaranteeing a uniform thickness of the synthetic resin coating on the surface of the derived timber board.

Furthermore, the addition of fibers causes the shrinkage of the synthetic resin during curing the tensile forces occurring in the surface of the coated derived timber board and the deformations caused as a result to be significantly reduced. In order to ensure that no undesired deformations of the derived timber board occur, a so-called counteracting layer of the same synthetic resin or of a substance with comparable properties can be applied on the opposite surface of the derived timber board, which is normally the underside in the position used, in order to equalize the tensile forces that arise.

A synthetic resin coating of this kind reinforced with fibers can be used without paper as a carrier material and, as a result, is much more cost-advantageous and can be produced with less expenditure of energy than known coatings.

The addition of fibers improves cohesive strength and, in particular, the adhesion of coatings of synthetic resin, which are applied to derived timber board surfaces, with this especially applying to thermosetting synthetic resins. The addition of fibers has proven to be particularly suitable in the case of aminoplastics, especially in the case of melamine resins.

The term "fibers" is interpreted very broadly in connection with the invention at hand. It comprises both typical fibers, the diameter of which is small in comparison to the length, and particles, which are rectangular or spherical, i.e. with approximately equal dimensions in terms of length, height and width, such as crystalline cellulose particles. All known fibers are suited for use in accordance with the invention with reference to the material as well. Cellulose fibers in particular are suited, be it in the form of natural cotton fibers such as linters, as particles of crystalline cellulose or in the form of the synthetically manufactured fibers of Viscose, Tencel or the like. However, synthetic fibers, fibers made of glass or fibers made of ceramic are suited if they are compatible with the synthetic resin selected in the particular case. Mixtures of at least two of the aforementioned fibers, which are added to a synthetic resin to coat the surface of a derived timber board, have proven to be particularly advantageous.

The diameter of the fibers can typically be from 10 μm to 150 μm, preferably from 15 μm to 40 μm. The length of the fibers can be from 10 μm to 100 μm, preferably from 10 μm to 80 μm. The fibers used in accordance with the invention do not need to exhibit a high degree of slimness; they can also be used as cubic fibers with almost equal edge lengths or as round particles.

Small amounts of fibers already suffice to achieve the desired purpose in accordance with the invention. 5 percentage by weight (weight %) of fibers with reference to the weight of the synthetic resin used suffices in order to significantly improve the formation of coating, e.g. of a melamine resin on a derived timber board surface, particularly in order to make same more uniform and to simultaneously improve the adhesion of the synthetic resin on the derived timber board. According to a preferred embodiment of the invention, fibers having 1 to 40 weight percent with reference to the weight of the synthetic resin used are employed, with 5 to 20 weight percent being especially preferred.

The addition of fibers to the synthetic resin applied is technically possible with no further difficulties. The viscosity of the synthetic resin to be applied can increase as the concentration of fibers in the synthetic resin to be applied and/or increasing length or, as the case may be, size of the fibers increases. However, this is acceptable in broad ranges.

According to another preferred embodiment of the invention, the fibers are transparent on the derived timber board following curing of the synthetic resin coating. As a result, the visibility of any decoration, which has already been applied to the surface of the derived timber board, remains unaffected.

The addition of corundum to the fiber-reinforced synthetic resin coating in accordance with the invention to the surface of the derived timber board is possible with no problem. If the corundum is applied homogenously with the fiber-reinforced synthetic resin, it is not effectively shielded by the fibers, which circumstance can lead to increased wear of the pressing sheets. In order to remedy this problem, it may prove to be expedient to apply a minimum of one additional coating over the existing fiber-reinforced synthetic resin coating in accordance with the invention, with such additional coating being of a synthetic resin or a synthetic resin mixture such as an additional layer consisting of synthetic resin, which may also be reinforced with fibers if necessary.

According to an advantageous embodiment, the fiber-reinforced synthetic resin coating, which is applied at least in parts to the surface of a derived timber board, is a component of a multi-layered surface coating. Accordingly, e.g. decorative colour coats, wearing coatings with corundum components, elastically deformable, soft coatings or finishing paints can follow one another, in order to render the surface of a derived timber board, which is to be trod on, resistant to wear and tear. According to a preferred embodiment of the invention, such coats are all applied directly to the surface, for example, by spraying or with a roller or squeegee. If corundum is used, it can be applied using a sprinkler arrangement. It can be sprinkled directly into the fiber-reinforced synthetic resin coat.

The invention further refers to a method for applying a liquid synthetic resin fiber mixture to a derived timber board, comprising the steps of, Mixing fibers into a liquid synthetic resin Painting, rolling, pouring on or spraying the synthetic resin or using a squeegee to apply the synthetic resin-fiber mixture to the derived timber board Drying the synthetic resin-fiber mixture.

If a surface coating of a plurality of layers is applied in accordance with the invention, the layer of liquid synthetic resin provided with fibers can readily be disposed at any desired place of the multi-layered surface structure as one of multiple layers.

According to an advantageous development of the invention, to the extent that the layers are such that the material must dry or cure, it is possible to have the coating that has just been applied, dry or cure to the extent that the next coating can be applied. Simultaneous and full curing of all of the layers does not occur until all of the layers have been applied. Such intermittent drying is expedient with reference to costs and with reference to connection of the various layers among each other.

DETAILED DESCRIPTION OF THE PREFERRED EMBODIMENT(S)

The following examples of embodiment illustrate the invention in more detail:

Example 1

65 g/m$^2$ of a melamine resin exhibiting a solids content of approx. 58% are applied to the upper side and the underside of a fiber board of medium thickness. Crystalline cellulose particles of 20 weight percent are added to the melamine resin. The cellulose particles have a diameter of 100 μm. Application is effected by means of rollers.

The melamine resin coating thus applied is precondensed in a hot air oven until the residual moisture of the melamine resin reaches 6 weight percent. Final curing of the melamine resin takes place in a short-cycle press at 165° C. for 20 seconds. The derived timber board coated equally on both sides is uniformly coated with no blemishes and invariably level after the melamine resin coating has cured.

Example 2

80 g/m$^2$ of a mixture of melamine resin exhibiting a solids content of approx. 58% are applied to the upper side of a fiber board of medium density (MDF) on which a decoration was printed previously. The melamine resin is mixed with 20 g/m$^2$ cellulose particles having a diameter of 80 to 100 μm. Further, 20 g/m$^2$ of corundum in the form of cubic particles having an edge length of 40 to 60 μm are added to the melamine resin. The specification of "g/m$^2$" refers to the amount in each case, which is applied to one square metre of surface of the derived timber board.

Following interim drying of the coating containing corundum, a further coating of melamine resin and cellulose is applied. The melamine resin is applied with an amount of 30 g/m$^2$, the cellulose mixed into the melamine resin with an amount of 10 g/m$^2$. The cellulose particles in this coating have a diameter of 10 μm to 20 μm.

A counteracting coating of 50 g/m$^2$ of melamine resin and 10 g/m$^2$ of cellulose particles is applied to the underside of the MDF board.

These fiber-reinforced melamine coats are pre-dried down to a residual moisture of 6% water content in the synthetic resin coating in a warm-air current.

Subsequent processing of the MDF boards coated with fiber-reinforced melamine resin takes place in short-cycle presses at 165° C. for 20 sec. to obtain boards exhibiting highly abrasive properties on the upper side printed with the decorative elements and used as floor laminate boards.

What is claimed is:

1. A derived timber board with a coating applied at least in parts to at least one surface of said timber board, said applied coating including at least one layer comprising a synthetic resin reinforced with a plurality of fibres, said fibers being present in a concentration of at least 1.0 wt % with reference to a weight of the synthetic resin, said fibers preventing shrinkage of said synthetic resin during curing so as to increase adhesion of said applied coating to said at least one surface.

2. The derived timber board according to claim 1, wherein the fiber-reinforced synthetic resin coating comprises a thermosetting synthetic resin.

3. The derived timber board according to claim 2, wherein the thermosetting synthetic resin is an aminoplastic.

4. The derived timber board according to claim 2, wherein the thermosetting synthetic resin is a melamine resin.

5. The derived timber board according to claim 1, wherein said fibers are selected from the group consisting of cellulose fibers, viscose fibers, synthetic fibers, fibers made of glass, fibers made of ceramic, and mixtures thereof.

6. The derived timber board according to claim 1, wherein said fibers are present in a concentration of at least 5 weight percent with reference to a weight of the synthetic resin.

7. The derived timber board according to claim 6, wherein the concentration is in the range of from 5 to 40 weight percent.

8. The derived timber board according to claim 6, wherein the concentration is in the range of from 5 to 20 weight percent.

9. The derived timber board according to claim 1, wherein the fibers are transparent after the synthetic resin has cured.

10. The derived timber board according to claim 1, wherein the at least one synthetic resin coating reinforced with fibers contains corundum.

11. The derived timber board according to claim 1, wherein the at least one fiber-reinforced synthetic resin coating is a component of a multi-layered surface coating.

12. A method for applying a liquid synthetic resin-fiber mixture to a derived timber board, comprising the steps of:

mixing fibers into a liquid synthetic resin;

applying the synthetic resin-fiber mixture to at least one surface of the derived timber board; and drying the synthetic resin-fiber mixture until said synthetic resin is cured.

13. The method according to claim 12, wherein said mixing step comprises mixing fibers in a range from 1.0 to 40 weight percent with reference to the weight of the synthetic resin into the synthetic resin.

14. The method according to claim 12, wherein the drying step comprises drying the synthetic resin-fiber mixture in a plurality of stages.

* * * * *